(12) United States Patent
Sun et al.

(10) Patent No.: US 9,891,494 B2
(45) Date of Patent: Feb. 13, 2018

(54) PIXEL UNIT AND DRIVING METHOD THEREOF, DRIVING MODULE, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhihua Sun, Beijing (CN); Seungmin Lee, Beijing (CN); Baoyu Liu, Beijing (CN); Weichao Ma, Beijing (CN); Shulin Yao, Beijing (CN); Xu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/130,274

(22) Filed: Apr. 15, 2016

(65) Prior Publication Data

US 2016/0329010 A1    Nov. 10, 2016

(30) Foreign Application Priority Data

May 5, 2015   (CN) .......................... 2015 1 0223659

(51) Int. Cl.
  *G09G 3/36*   (2006.01)
  *G02F 1/1368*  (2006.01)
  (Continued)

(52) U.S. Cl.
  CPC ........ *G02F 1/1368* (2013.01); *G02F 1/13306* (2013.01); *G02F 1/133514* (2013.01);
  (Continued)

(58) Field of Classification Search
  USPC ...................................................... 345/87–88
  See application file for complete search history.

(56) References Cited

U.S. PATENT DOCUMENTS

| 5,642,176 A | 6/1997 | Abukawa et al. |
| 7,304,700 B2 | 12/2007 | Park et al. |
| 2007/0063945 A1* | 3/2007 | Hung .................. G09G 3/3607 345/88 |

FOREIGN PATENT DOCUMENTS

| CN | 1624544 A | 6/2005 |
| CN | 103376592 A | 10/2013 |
| WO | 2012/161060 A1 | 11/2012 |

OTHER PUBLICATIONS

Office Action dated May 9, 2017 issued in corresponding Chinese Application No. 201510223659.8.

* cited by examiner

*Primary Examiner* — Roy Rabindranath
(74) *Attorney, Agent, or Firm* — Nath, Goldberg & Meyer; Joshua B. Goldberg

(57) ABSTRACT

The invention relates to a pixel unit, a driving method of the pixel unit, a driving module of the pixel unit, a display panel and a display device. The pixel unit includes four sub-pixels and a first color filter, a second color filter, a third color filter and a fourth color filter corresponding to the four sub-pixels respectively, the first color filter allows only light of a first color to pass through, the second color filter allows only light of a second color to pass through, the third color filter allows only light of a third color to pass through, and the fourth color filter allows light of n different colors selected from the first color, the second color, and the third color to pass through, wherein n is larger than or equal to 2.

14 Claims, 1 Drawing Sheet

(51) Int. Cl.
  *G09G 3/20*   (2006.01)
  *G02F 1/1335*  (2006.01)
  *G02F 1/133*   (2006.01)
(52) U.S. Cl.
  CPC ... *G09G 3/2003* (2013.01); *G09G 2300/0452* (2013.01); *G09G 2320/0233* (2013.01); *G09G 2320/0242* (2013.01)

PIXEL UNIT AND DRIVING METHOD THEREOF, DRIVING MODULE, DISPLAY PANEL AND DISPLAY DEVICE

FIELD OF THE INVENTION

The invention relates to the technical field of liquid crystal display, and in particular, relates to a pixel unit, a driving method of the pixel unit, a driving module of the pixel unit, a display panel including the pixel unit and the driving module, and a display device including the display panel.

FIELD OF THE INVENTION

In a thin film transistor liquid crystal display (abbreviated as TFT-LCD), each pixel unit generally includes three sub-pixels, and each sub-pixel is provided with a color filter of one color so that the sub-pixel displays one corresponding color; generally, the three sub-pixels display light of red, green and blue, respectively, and the three colors form a color space to display various colors.

In an improved pixel unit of the TFT-LCD, a fourth sub-pixel is introduced, and is provided with a color filter which allows white light to pass through (that is, it allows light of all colors to pass through), and since the fourth sub-pixel allows more light to pass through so as to increase transmittance of the pixel unit, the pixel unit with four sub-pixels of red, green, blue and white can display with a higher maximum brightness compared to the pixel unit with three sub-pixels of red, green and blue.

As for the pixel unit with four sub-pixels of red, green, blue and white, however, while the white sub-pixel is intruded to increase transmittance and improve brightness, light passing through the white sub-pixel will affect the color space formed by three colors of red, green and blue, which will result in adverse effects such as a decreased color gamut and a lowered contrast of the display of the pixel unit, thereby reducing display quality of the TFT-LCD.

SUMMARY OF THE INVENTION

The present invention aims to solve at least one of the technical problems existing in the prior art, and proposes a pixel unit, a driving method of the pixel unit, a driving module of the pixel unit, a display panel and a display device, which can improve the maximum brightness and prevent the display quality such as display color gamut and display contrast from decreasing, so as to ensure that the pixel unit has a better display effect.

A pixel unit is provided to achieve the object of the invention, and includes four sub-pixels and a first color filter, a second color filter, a third color filter and a fourth color filter corresponding to the four sub-pixels respectively, the first color filter allows only light of a first color to pass through, the second color filter allows only light of a second color to pass through, the third color filter allows only light of a third color to pass through, and the fourth color filter allows only light of n different colors selected from the first color, the second color, and the third color to pass through, wherein n is larger than or equal to 2.

Preferably, the first color is blue, the second color is green and the third color is red.

Preferably, the fourth color filter allows only light of the first color, the second color and the third color to pass through.

Preferably, the fourth color filter allows white light formed by a combination of light of the first color, the second color and the third color to pass through.

As another technical solution, the invention provides a driving method for the above pixel unit, including: calculating values of respective color components of light of n different colors which the fourth color filter allows to pass therethrough when the sub-pixel which the fourth color filter belongs to displays each of all gray levels, to obtain data fields of the respective color components of each of n different colors when the sub-pixel which the fourth color filter belongs to displays each of all gray levels; after obtaining the data fields, when the pixel unit is required to display a certain color, calculating a value of color component of the first color, a value of color component of the second color, and a value of color component of the third color required for displaying the certain color; under the assumption that when the sub-pixel which the fourth color filter belongs to displays an mth gray level, among the n different colors which the fourth color filter allows to pass therethrough, the value of color component of each color is smaller than the value of color component of the same color required for the pixel unit to display the certain color, comparing the data field of each color of the n different colors with the calculated value of color component of the same color required for the pixel unit to display the certain color, to calculate a value of m; when the sub-pixel which the fourth color filter belongs to displays the mth gray level, calculating values of difference between the value of color component of each color of the n different colors which the fourth color filter allows to pass therethrough and the value of color component of the same color required for the pixel unit to display the certain color; and causing the sub-pixel, which the fourth color filter belongs to, to display the mth gray level, causing the sub-pixel, which the color filter allowing only light of one color among the n different colors to pass therethrough belongs to, to display a value of color component equal to the above calculated value of difference for the one color, and causing the sub-pixel, which the color filter allowing only light of a color other than the n different colors to pass therethrough belongs to, to display a value of color component equal to the value of color component of the same color required for the pixel unit to display the certain color, so that the pixel unit can display the certain color.

Preferably, the first color is blue, the second color is green and the third color is red.

Preferably, the fourth color filter allows only light of the first color, the second color and the third color to pass through.

Preferably, the fourth color filter allows white light formed by a combination of light of the first color, the second color and the third color to pass through.

As another technical solution, the invention further provides a driving module of the above pixel unit, including:

a first calculating module, configured to calculate values of respective color components of light of n different colors which the fourth color filter allows to pass therethrough when the sub-pixel which the fourth color filter belongs to displays each of all gray levels, to obtain data fields of the respective color components of each of n different colors when the sub-pixel which the fourth color filter belongs to displays each of all gray levels;

a second calculating module, configured when the pixel unit is required to display a certain color, to calculate a value of color component of the first color, a value of color component of the second color, and a value of color component of the third color required for displaying the certain color;

a third calculating module, configured to compare the data field of each color of the n different colors with the calculated value of color component of the same color required for the pixel unit to display the certain color, to calculate a gray level required for the sub-pixel, which the fourth color filter belongs to, to display when the value of color component of each color of the n different colors, which the fourth color filter allows to pass therethrough, is smaller than the value of color component of the same color required for the pixel unit to display the certain color;

a fourth calculating module, configured when the sub-pixel which the fourth color filter belongs to displays the gray level calculated by the third calculating module, to calculate values of difference between the value of color component of each color of the n different colors which the fourth color filter allows to pass therethrough and the value of color component of the same color required for the pixel unit to display the certain color; and a display module, configured to cause the sub-pixel, which the fourth color filter belongs to, to display the gray level calculated by the third calculating module, cause the sub-pixel, which the color filter allowing only light of one color among the n different colors to pass therethrough belongs to, to display a value of color component equal to the above calculated value of difference for the one color, and cause the sub-pixel, which the color filter allowing only light of a color other than the n different colors to pass therethrough belongs to, to display a value of color component equal to the value of color component of the same color required for the pixel unit to display the certain color, so that the pixel unit can display the certain color.

Preferably, the first color is blue, the second color is green and the third color is red.

Preferably, the fourth color filter only allows light of the first color, the second color and the third color to pass through.

Preferably, the fourth color filter allows white light formed by a combination of light of the first color, the second color and the third color to pass through.

As another technical solution, the invention provides a display panel, including the above pixel unit provided by the invention and the driving module of the pixel unit provided by the invention.

As another technical solution, the invention provides a display device, including the display panel provided by the invention.

The invention can achieve the following technical effects:

In the pixel unit provided by the invention, the fourth color filter corresponding to the fourth sub-pixel allows only light of two colors or three colors among the first color, the second color and the third color to pass through, so as to improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

In the driving method of the pixel unit provided by the invention, the fourth color filter which allows only light of two or three colors among the first color, the second color and the third color to pass therethrough and the three color filters each of which allow only light of one color among the first to third colors to pass therethrough are combined together to display respective color components of basic colors forming a certain color to be displayed by the pixel unit, so as to improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

In the driving module of the pixel unit provided by the invention, the fourth color filter which allows only light of two or three colors among the first color, the second color and the third color to pass therethrough and the three color filters each of which allow only light of one color among the three colors to pass therethrough are combined together to display respective color components of basic colors forming a certain color to be displayed by the pixel unit, so as to improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

The display panel provided by the invention includes the pixel unit provided by the invention and the driving module provided by the invention, and can improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

The display device provided by the invention includes the display panel provided by the invention, and can improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

BRIEF DESCRIPTION OF THE DRAWINGS

The drawings that provide further understanding of the invention, and constitute a part of the specification, are used to interpret the invention in conjunction with the following embodiments, but not to limit the invention. In the drawings.

REFERENCE NUMERALS

1: first color filter; 2: second color filter; 3: third color filter; 4: fourth color filter.

DETAILED DESCRIPTION OF THE EMBODIMENTS

Embodiments of the invention will be described in detail below in conjunction with the drawings. It should be understood that, the embodiment described herein are only used to illustrate and interpret the invention, and do not limit the invention.

Figure 1:
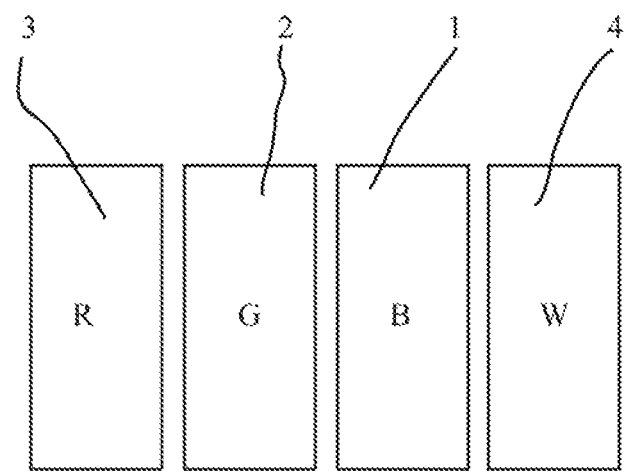
FIG. 1 is a schematic view of a pixel unit provided by an embodiment of the invention.

An embodiment of the invention provides a pixel unit, and FIG. 1 is a schematic view of the pixel unit according to the embodiment of the invention. As shown in FIG. 1, in the embodiment, the pixel unit includes four sub-pixels, which are provided with a first color filter 1, a second color filter 2, a third color filter 3 and a fourth color filter 4, respectively. The first color filter 1 allows only light of a first color to pass through, the second color filter 2 allows only light of a second color to pass through, the third color filter 4 allows only light of a third color to pass through, and the fourth color filter 4 allows only light of two or three colors selected from the first color, the second color, and the third color to pass through.

In the embodiment, the first color, the second color and the third color form a color space, and the pixel unit achieves display of various colors by adjusting components of the first color, the second color and the third color. In particular, the first color may be blue, the second color may be green, and the third color may be red; that is, the first color filter 1 is a blue color filter, the second color filter 2 is a green color filter, and the third color filter is a red color filter.

In the embodiment, it is assumed that wavelength of the light of the first color is between a first wavelength and a second wavelength, wavelength of the light of the second color is between a third wavelength and a fourth wavelength, and wavelength of the light of the third color is between a fifth wavelength and a sixth wavelength, and moreover, the first to six wavelengths meet the following relationship: the first wavelength<the second wavelength<the third wavelength<the fourth wavelength<the fifth wavelength<the sixth wavelength. The fourth color filter 4 allows only light of n different colors selected from the first to third colors to pass through, and filters out light of color other than the n different colors; in particular, when n=2, the fourth color filter 4 allows only light of two colors among the first to third colors to pass through, for example, the fourth color filter 4 allows only light of the first and second colors to pass through, and in this case light having a wavelength smaller than the first wavelength, or between the second wavelength and the third wavelength, or larger than the fourth wavelength is filtered out. When n=3, the fourth color filter 4 allows light of the first to three colors to pass through, and in this case light having a wavelength smaller than the first wavelength, or between the second wavelength and the third wavelength, or between the fourth wavelength and the fifth wavelength, or larger than the sixth wavelength is filtered out.

The fourth color filter 4 allows light of two or three colors to pass through, so that as for light emitted from a backlight source, the fourth color filter has a larger light transmittance than that of each of the first to three color filters, and thus compared to the pixel unit provided with only three color filters in the prior art (for example, provided with only the first color filter 1, the second color filter 2 and the third color filter 3), the pixel unit in the embodiment has a larger transmittance, and can display with a larger maximum brightness.

Moreover, the fourth color filter 4 allows only light of two or three colors among the first to third colors to pass through. That is, the fourth color filter 4 filters out light of color other than the first to three colors, and allows only light of colors among the first to three colors to pass through. Thus, light passing through the fourth color filter 4 does not include light of color other than the first to three colors, and since light of color other than the first to third colors will interfere with the normal display of the pixel unit which uses the color space formed by the first to third colors, the fourth color filter 4 is introduced in the invention to eliminate the interference to the normal display of the pixel unit.

Figure 2:
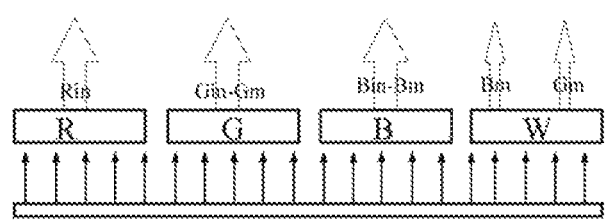
FIG. 2 is a schematic view illustrating a display principle of the pixel unit shown in FIG. 1.

Further, in the embodiment, during the display process, the light of n different colors passing through the fourth color filter 4 may be used to enhance and supplement light passing through the first color filter 1, the second color filter 2 and the third color filter 3, that is, the light of n different colors passing through the fourth color filter 4 may be used to enhance and supplement light passing through the respective color filters corresponding to the n different colors among the first to third colors so as to achieve a desired display. For example, when the n different colors include the first color (blue) and the second color (green), as shown in FIG. 2, a blue component Bm of light passing through the fourth color filter 4 and a blue component Bin-Bm of light passing through the first color filter 1 are both parts of a blue component required for the pixel unit to display, and are combined together to obtain a blue component Bin of a color to be displayed by the pixel unit so as to achieve the desired display effect, rather than only using the blue component of light passing through the first color filter 1 to achieve the blue component Bin of the color to be displayed by the pixel unit, which will avoid the phenomenon in which the blue component Bm of light passing through the fourth color filter 4 interferes with the normal display of the blue light passing through the first color filter 1 to result in abnormity of the finally displayed blue component; the case is the same with the second color (green), and description thereof will not be repeated herein. In the invention, by setting color components of light of various colors passing through the first to fourth color filters in the above manner, the problem of decreased display quality such as display color gamut and display contrast due to the interference of the light of two or three colors passing through the fourth color filter 4 with the normal display of the pixel unit can be avoided.

In view of above, in the pixel unit according to the embodiment of the invention, the fourth color filter 4 allows only light of two or three colors among the first to third colors to pass through, and thus not only the pixel unit can display with a larger maximum brightness, but also the decrease of display quality such as display color gamut and display contrast due to the interference of the light of two or three colors passing through the fourth color filter 4 with the normal display of the pixel unit can be prevented by setting color components of light of various colors passing through the first to fourth color filters in the above manner, and it is ensured that the pixel unit has a better display effect.

In the embodiment, preferably, the fourth color filter 4 allows the first color, the second color and the third color to pass through; compared to the case of n=2 in which the fourth color filter 4 allows only light of two colors to pass through, such an arrangement allows light of more colors to pass through the fourth color filter 4, and so the maximum brightness that the pixel unit can achieve may be enhanced to a larger extent. Light that the fourth color filter 4 allows to pass through includes a white light formed by a combination of the first color, the second color and the third color.

The invention further provides a driving method of a pixel unit, which is the pixel unit provided by the above embodiment of the invention. The driving method includes steps of:

First, calculating values of respective color components of light of n different colors which the fourth color filter allows to pass therethrough when the sub-pixel which the fourth color filter belongs to displays each of all gray levels, to obtain data fields of the respective color components of light of n different colors when the sub-pixel which the fourth color filter belongs to displays each of all gray levels.

In this embodiment, principle and procedure of the driving method of the pixel unit will be described in detail taking the following case as an example: the first color is blue, the second color is green, and the third color is red, the fourth color filter allows only light of the first color, the second color and the third color to pass through, and the sub-pixel which the fourth color filter belongs to has 256 gray levels (0~255) of brightness.

In particular, in the first step, before the pixel unit displays a certain color, a red component $R_L$, a green component $G_L$ and a blue component $B_L$ of the color displayed by the sub-pixel which the fourth color filter belongs to when displaying each gray level are calculated, wherein $0 \leq L \leq 255$; $R_0$~$R_{255}$ form a data field $\{R_L\}$ of the red component when the sub-pixel which the fourth color filter belongs to displays each of all gray levels, $G_0$~$G_{255}$ form a data field $\{G_L\}$ of the green component when the sub-pixel which the fourth color filter belongs to displays each of all gray levels, and $B_0$~$B_{255}$ form a data field $\{B_L\}$ of the blue component when the sub-pixel which the fourth color filter belongs to displays each of all gray levels.

Second, after obtaining the above data fields, when the pixel unit is required to display the certain color, a value of color component of the first color, a value of color component of the second color, a value of color component of the third color required for displaying the certain color are calculated.

In particular, in the second step, according to the certain color to be displayed by the pixel unit, values of a red component Rin, a green component Gin and a blue component Bin in the certain color are calculated. It should be understood that, the certain color can be displayed as long as the red component, the green component and the blue component displayed by the pixel unit are Rin, Gin and Bin, respectively.

Third, assuming that when the sub-pixel which the fourth color filter belongs to displays an mth gray level, among the n different colors which the fourth color filter allows to pass therethrough, the value of color component of each color is smaller than the value of color component of the same color required for the pixel unit to display the certain color, the data field of each color of the n different colors is compared with the calculated value of color component of the same color required for the pixel unit to display the certain color, to calculate a value of m.

In particular, it should be understood that, when the pixel unit displays the certain color, red light, green light and blue light which the fourth color filter allows to pass through are only parts of red component, green component and blue component of the certain color, respectively. Thus, in the third step, Rin is compared with the data field $\{R_L\}$, Gin is compared with the data field $\{G_L\}$, and Bin is compared with $\{B_L\}$, until L which meets the following three equations (1), (2) and (3) is obtained, and the obtained L is the calculated m, that is, when the sub-pixel which the fourth color filter belongs to displays the m gray level, the amount of red light passing through the fourth color filter is smaller than the red component of the certain color, the amount of green light passing through the fourth color filter is smaller than the green component of the certain color, and the amount of blue light passing through the fourth color filter is smaller than the blue component of the certain color.

$$Rin \geq R_{L1} \quad (1)$$

$$Gin \geq G_{L2} \quad (2)$$

$$Bin \geq B_{L3} \quad (3)$$

wherein, L1=L2=L3.

After m is obtained, when the pixel unit displays the certain color, the sub-pixel which the fourth color filter belongs to displays the mth gray level, that is, the sub-pixel which the fourth color filter belongs to displays with the color components $R_m$, $G_m$ and $B_m$.

Fourth, when the sub-pixel which the fourth color filter belongs to displays the mth gray level, values of difference between the value of color component of each color of the n different colors which the fourth color filter allows to pass therethrough and the value of color component of the same color required for the pixel unit to display the certain color are calculated.

In particular, in the fourth step, $Rin-R_m$, $Gin-G_m$ and $Bin-B_m$ are calculated, respectively, and then the obtained three values are the red component to be displayed by the sub-pixel which the third color filter belongs, the green component to be displayed by the sub-pixel which the second color filter belongs to and the blue component to be displayed by the sub-pixel which the first color filter belongs to, respectively.

Based on the above, a sum of the blue component displayed by the sub-pixel which the first color filter belongs to and the blue component displayed by the sub-pixel which the fourth color filter belongs to is equal to the blue component of the color to be displayed by the pixel unit, a sum of the green component displayed by the sub-pixel which the second color filter belongs to and the green component displayed by the sub-pixel which the fourth color filter belongs to is equal to the green component of the color to be displayed by the pixel unit, and a sum of the red component displayed by the sub-pixel which the third color filter belongs to and the red component displayed by the sub-pixel which the fourth color filter belongs to is equal to the red component of the color to be displayed by the pixel unit, so that the pixel unit can display the color to be displayed.

The driving method according to the embodiment of the invention is described above taking the case, in which the sub-pixel which the fourth color filter belongs to allows the first color, the second color and the third color to pass through, as an example. Different from the above procedure, when the fourth color filter allows only light of two colors among the first to third colors, the sub-pixel which the color filter allowing only light of the color other than the two colors among the first to third colors belongs to should display the color component of that color which the pixel unit should display. For example, if the fourth color filter allows only light of the first color and the second color to pass through, when the pixel unit displays the certain color, the third color filter displays the color component Rin; similarly, if the fourth color filter allows only light of the first color and the third color to pass through, when the pixel unit displays the certain color, the second color filter displays the color component Gin; if the fourth color filter allows only light of the second color and the third color to pass through, when the pixel unit displays the certain color, the third color filter displays the color component Bin.

In the embodiment, preferably, the fourth color filter allows light of the first color, the second color and the third color to pass through; compared to the case of n=2 in which the fourth color filter allows only light of two colors to pass through, such an arrangement allows light of more colors to pass through the fourth color filter 4, and so the maximum brightness that the pixel unit can achieve may be enhanced to a larger extent. Further, light that the fourth color filter allows to pass through includes a white light formed by a combination of the first color, the second color and the third color.

In the driving method of the pixel unit according to the embodiment of the invention, the fourth color filter which allows only light of two or three colors among the first color, the second color and the third color to pass therethrough and the three color filters each of which allow only light of one color among the first to third colors to pass therethrough are combined together to display respective color components of basic colors forming a certain color to be displayed by the pixel unit, so as to improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

The invention further provides a driving module of a pixel unit, for driving the pixel unit according to the above embodiment of the invention. In this embodiment, the driving module of the pixel unit includes: a first calculating module, configured for calculating values of respective color components of light of n (n=2 or 3) different colors which the fourth color filter allows to pass therethrough when the sub-pixel which the fourth color filter belongs to displays each of all gray levels, to obtain data fields of the respective color components of light of n different colors when the sub-pixel which the fourth color filter belongs to displays each of all gray levels; a second calculating module, configured for calculating a value of color component of the first color, a value of color component of the second color, and a value of color component of the third color required for displaying a certain color when the pixel unit is required to display the certain color; a third calculating module, configured for comparing the data field of each color of the n different colors with the calculated value of color component of the same color required for the pixel unit to display the certain color, to calculate a gray level required for the sub-pixel, which the fourth color filter belongs to, to display when the value of color component of each color of the n different colors, which the fourth color filter allows to pass therethrough, is smaller than the value of color component of the same color required for the pixel unit to display the certain color; a fourth calculating module, configured, when the sub-pixel which the fourth color filter belongs to displays gray level calculated by the third calculating module, for calculating values of difference between the value of color component of each color of the n different colors which the fourth color filter allows to pass therethrough and the value of color component of the same color required for the pixel unit to display the certain color; and a display module, configured for causing the sub-pixel, which the fourth color filter belongs to, to display the gray level calculated by the third calculating module, causing the sub-pixel, which the color filter allowing only light of one color among the n different colors to pass therethrough belongs to, to display a value of color component equal to the above calculated value of difference for the one color, and causing the sub-pixel, which the color filter allowing only light of a color other than the n different colors to pass therethrough belongs to, to display a value of color component equal to the value of color component of the same color required for the pixel unit to display the certain color, so that the pixel unit can display the certain color.

In particular, when the pixel unit displays the certain color, the sub-pixel which the fourth color filter belongs to displays the mth gray level; a value of color component displayed by the sub-pixel, which the color filter only allowing light of one color among the n different colors to pass therethrough belongs to, is caused to be equal to the above calculated value of difference for the one color, and a value of color component displayed by the sub-pixel, which the color filter allowing only light of a color other than the n different colors to pass therethrough belongs to, is caused to be equal to the value of color component of the same color required for the pixel unit to display the certain color.

In the embodiment, preferably, the fourth color filter allows light of the first color, the second color and the third color to pass through; compared to the case of n=2 in which the fourth color filter allows only light of two colors to pass through, such an arrangement allows light of more colors to pass through the fourth color filter, and so the maximum brightness that the pixel unit can achieve may be enhanced to a larger extent. Further, light that the fourth color filter allows to pass through includes a white light formed by combining the first color, the second color and the third color.

In the driving module of the pixel unit according to the embodiment of the invention, the fourth color filter which allows only light of two or three colors among the first color, the second color and the third color to pass therethrough and the three color filters each of which allowing only light of one color among the first to third colors to pass therethrough are combined together to display respective color components of basic colors forming the certain color to be displayed by the pixel unit, so as to improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

An embodiment of the invention further provides a display panel. In the embodiment, the display panel includes the pixel unit according to the above embodiment of the invention, and is driven by the driving module according to the above embodiment of the invention, and displays with the driving method according to the above embodiment of the invention.

The display panel according to the embodiment of the invention includes the pixel unit according to the above embodiment of the invention and the driving module according to the above embodiment of the invention, and can improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

An embodiment of the invention further provides a display device, and in this embodiment, the display device includes the display panel according to the embodiment of the invention.

The display device according to the embodiment of the invention includes the display panel according to the above embodiment, and can improve the maximum brightness that the pixel unit can obtain and prevent the display quality such as the display color gamut and display contrast from decreasing due to the fact that light passing through the fourth color filter interferes with the normal display of the pixel unit, and ensure that the pixel unit has a better display effect.

It should be understood that, the foregoing embodiments are only exemplary embodiments used for explaining the principle of the present invention, but the present invention is not limited thereto. Various variations and improvements may be made by a person skilled in the art without departing from the protection scope of the present invention, and these variations and improvements also fall into the protection scope of the present invention.

What is claimed is:

1. A driving method for a pixel unit, the pixel unit including four sub-pixels and a first color filter, a second color filter, a third color filter and a fourth color filter corresponding to the four sub-pixels respectively, the first color filter allows only light of a first color to pass through, the second color filter allows only light of a second color to pass through, the third color filter allows only light of a third color to pass through, and the fourth color filter allows only light of n different colors selected from the first color, the second color, and the third color to pass through, wherein n is larger than or equal to 2, the driving method including:

calculating values of respective color components of light of n different colors which the fourth color filter allows to pass therethrough when the sub-pixel which the fourth color filter belongs to displays each of all gray levels, to obtain data fields of the respective color components of light of n different colors when the sub-pixel which the fourth color filter belongs to displays each of all gray levels;

after obtaining the data fields, when the pixel unit is required to display a certain color, calculating a value of color component of the first color, a value of color component of the second color, and a value of color component of the third color required for displaying the certain color;

under the assumption that when the sub-pixel which the fourth color filter belongs to displays an mth gray level, among the n different colors which the fourth color filter allows to pass therethrough, the value of color component of each color is smaller than the value of color component of the same color required for the pixel unit to display the certain color, comparing the data field of each color of the n different colors with the calculated value of color component of the same color required for the pixel unit to display the certain color, to calculate a value of m;

when the sub-pixel which the fourth color filter belongs to displays the mth gray level, calculating values of difference between the value of color component of each color of the n different colors which the fourth color filter allows to pass therethrough and the value of color component of the same color required for the pixel unit to display the certain color; and causing the sub-pixel, which the fourth color filter belongs to, to display the mth gray level, causing the sub-pixel, which the color filter allowing only light of one color among the n different colors to pass therethrough belongs to, to display a value of color component equal to the above calculated value of difference for the one color, and causing the sub-pixel, which the color filter allowing only light of a color other than the n different colors to pass therethrough belongs to, to display a value of color component equal to the value of color component of the same color required for the pixel unit to display the certain color, so that the pixel unit can display the certain color.

2. The driving method of claim 1, wherein the first color is blue, the second color is green and the third color is red.

3. The driving method of claim 2, wherein the fourth color filter only allows light of the first color, the second color and the third color to pass through.

4. The driving method of claim 3, wherein the fourth color filter allows white light formed by a combination of light of the first color, the second color and the third color to pass through.

5. The driving method of claim 1, wherein the fourth color filter only allows light of the first color, the second color and the third color to pass through.

6. The driving method of claim 5, wherein the fourth color filter allows white light formed by a combination of light of the first color, the second color and the third color to pass through.

7. A driving module for a pixel unit, the pixel unit including four sub-pixels and a first color filter, a second color filter, a third color filter and a fourth color filter corresponding to the four sub-pixels respectively, the first color filter allows only light of a first color to pass through, the second color filter allows only light of a second color to pass through, the third color filter allows only light of a third color to pass through, and the fourth color filter allows only light of n different colors selected from the first color, the second color, and the third color to pass through, wherein n is larger than or equal to 2, the driving module including:

a first calculating module, configured to calculate values of respective color components of light of n different colors which the fourth color filter allows to pass therethrough when the sub-pixel which the fourth color filter belongs to displays each of all gray levels, to obtain data fields of the respective color components of each of n different colors when the sub-pixel which the fourth color filter belongs to displays each of all gray levels;

a second calculating module, configured, when the pixel unit is required to display a certain color, to calculate a value of color component of the first color, a value of color component of the second color, and a value of color component of the third color required for displaying the certain color;

a third calculating module, configured to compare the data field of each color of the n different colors with the calculated value of color component of the same color required for the pixel unit to display the certain color, to calculate a gray level required for the sub-pixel, which the fourth color filter belongs to, to display when the value of color component of each color of the n different colors, which the fourth color filter allows to pass therethrough, is smaller than the value of color component of the same color required for the pixel unit to display the certain color;

a fourth calculating module, configured, when the sub-pixel which the fourth color filter belongs to displays the gray level calculated by the third calculating module, to calculate values of difference between the value of color component of each color of the n different colors which the fourth color filter allows to pass therethrough and the value of color component of the same color required for the pixel unit to display the certain color; and a display module, configured to cause the sub-pixel, which the fourth color filter belongs to, to display the gray level calculated by the third calculating module, cause the sub-pixel, which the color filter allowing only light of one color among the n different colors to pass therethrough belongs to, to display a value of color component equal to the above calculated value of difference for the one color, and cause the sub-pixel, which the color filter allowing only light of a color other than the n different colors to pass therethrough belongs to, to display a value of color component equal to the value of color component of the same color required for the pixel unit to display the certain color, so that the pixel unit can display the certain color.

8. The driving module of claim 7, wherein the first color is blue, the second color is green and the third color is red.

9. The driving module of claim 8, wherein the fourth color filter only allows light of the first color, the second color and the third color to pass through.

10. The driving module of claim 9, wherein the fourth color filter allows white light formed by a combination of light of the first color, the second color and the third color to pass through.

11. The driving module of claim 7, wherein the fourth color filter only allows light of the first color, the second color and the third color to pass through.

12. The driving module of claim 11, wherein the fourth color filter allows white light formed by a combination of light of the first color, the second color and the third color to pass through.

13. A display panel, including a pixel unit and a driving module for the pixel unit, wherein
the pixel unit includes four sub-pixels and a first color filter, a second color filter, a third color filter and a fourth color filter corresponding to the four sub-pixels respectively, the first color filter allows only light of a first color to pass through, the second color filter allows only light of a second color to pass through, the third color filter allows only light of a third color to pass through, and the fourth color filter allows only light of n different colors selected from the first color, the second color, and the third color to pass through, wherein n is larger than or equal to 2; and
the driving module includes a first calculating module, configured to calculate values of respective color components of light of n different colors which the fourth color filter allows to pass therethrough when the sub-pixel which the fourth color filter belongs to displays each of all gray levels, to obtain data fields of the respective color components of each of n different colors when the sub-pixel which the fourth color filter belongs to displays each of all gray levels; a second calculating module, configured, when the pixel unit is required to display a certain color, to calculate a value of color component of the first color, a value of color component of the second color, and a value of color component of the third color required for displaying the certain color; a third calculating module, configured to compare the data field of each color of the n different colors with the calculated value of color component of the same color required for the pixel unit to display the certain color, to calculate a gray level required for the sub-pixel, which the fourth color filter belongs to, to display when the value of color component of each color of the n different colors, which the fourth color filter allows to pass therethrough, is smaller than the value of color component of the same color required for the pixel unit to display the certain color; a fourth calculating module, configured, when the sub-pixel which the fourth color filter belongs to displays the gray level calculated by the third calculating module, to calculate values of difference between the value of color component of each color of the n different colors which the fourth color filter allows to pass therethrough and the value of color component of the same color required for the pixel unit to display the certain color; and a display module, configured to cause the sub-pixel, which the fourth color filter belongs to, to display the gray level calculated by the third calculating module, cause the sub-pixel, which the color filter allowing only light of one color among the n different colors to pass therethrough belongs to, to display a value of color component equal to the above calculated value of difference for the one color, and cause the sub-pixel, which the color filter allowing only light of a color other than the n different colors to pass therethrough belongs to, to display a value of color component equal to the value of color component of the same color required for the pixel unit to display the certain color, so that the pixel unit can display the certain color.

14. A display device, including the display panel of claim 13.

* * * * *